US007684959B2

(12) United States Patent  
Garzia et al.

(10) Patent No.: US 7,684,959 B2
(45) Date of Patent: Mar. 23, 2010

(54) STABILITY INDEX DISPLAY

(75) Inventors: Mario R. Garzia, Redmond, WA (US); Mingtian Ni, Redmond, WA (US); Todor Ivanov Jivakov, Redmond, WA (US); Peng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/674,889

(22) Filed: Feb. 14, 2007

(65) Prior Publication Data

US 2008/0027680 A1 Jan. 31, 2008

Related U.S. Application Data

(60) Provisional application No. 60/833,028, filed on Jul. 25, 2006.

(51) Int. Cl.
*G06F 11/30* (2006.01)
*G06F 11/32* (2006.01)
*G06F 19/00* (2006.01)
*G06F 17/40* (2006.01)

(52) U.S. Cl. .................. 702/182; 340/500; 340/540; 340/679; 702/1; 702/127; 702/183; 702/185; 702/187

(58) Field of Classification Search .......... 340/500, 340/540, 679; 702/1, 33, 34, 127, 182, 183, 702/184, 185, 186, 187, 189
See application file for complete search history.

(56) References Cited

U.S. PATENT DOCUMENTS 2,883,255 A * 4/1959 Anderson ............... 346/34
4,631,930 A * 12/1986 Gutschmit et al. ......... 66/1 R
6,016,204 A * 1/2000 Budnik et al. .......... 358/1.14
6,044,335 A    3/2000 Ksendzov
6,680,806 B2   1/2004 Smith
6,892,236 B1   5/2005 Conrad et al.
6,901,347 B1   5/2005 Murray et al.
6,993,454 B1   1/2006 Murstein et al.
7,072,805 B2   7/2006 Cascaval et al.
2002/0049687 A1* 4/2002 Helsper et al. ............ 706/45
2002/0143421 A1* 10/2002 Wetzer .................. 700/100
2003/0229693 A1 12/2003 Mahlik et al.
2004/0127999 A1  7/2004 Murase et al.
2005/0065753 A1  3/2005 Bigus et al.
2005/0198576 A1  9/2005 Childress et al.
2006/0044326 A1* 3/2006 Hiyoshi et al. .......... 345/619
2006/0048101 A1* 3/2006 Krassovsky et al. ...... 717/127

(Continued)

FOREIGN PATENT DOCUMENTS

JP     59-174957 A  *  10/1984

OTHER PUBLICATIONS

Libassi, M., "Weighted Stability Index (WSI) Metric Model", Intel Corp Aug. 1999, www.stickyminds.com/getfile.asp?ot=XML&id=2810&fn=XDD2810filelistfilename1.pdf.

(Continued)

*Primary Examiner*—Edward R Cosimano
(74) *Attorney, Agent, or Firm*—Marshall, Gerstein & Borun LLP

(57) ABSTRACT

The stability index objectively reflects system reliability and yet intuitively reflects the user experience on the system while also providing an understanding of how/when/why problems began.

15 Claims, 3 Drawing Sheets

U.S. PATENT DOCUMENTS

2006/0075406 A1    4/2006  Sinha
2006/0184714 A1*   8/2006  Dang et al. .................. 711/100
2006/0242467 A1*  10/2006  Dayen et al. .................. 714/38

OTHER PUBLICATIONS

Yang et al., "Statistical data reduction for efficient application performance monitoring", IEEE 2006, http://ieeexplore.ieee.org/iel5/10856/34197/01630837.pdf?tp=&arnumber=1630837&isnumber=34197.

Vetter et al., "Managing Performance Analysis with Dynamic Statistical Projection Pursuit", IEEE, 1999, http://ieeexplore.ieee.org/iel5/10615/33524/01592687.pdf?tp=&arnumber=1592687&isnumber=33524.

* cited by examiner

STABILITY INDEX DISPLAY

This is a non-provisional of expired U.S. Provisional Application Ser. No. 60/833,028, filed Jul. 25, 2006, the entire disclosure of which is incorporated herein by reference.

BACKGROUND

Software and hardware reliability can be a significant contributor to a user's satisfaction. Currently computer system reliability is measured using various metrics such as mean time to failure, mean time to restore, availability, mean number of failures, etc. These are not intuitive to all users (consumers to IT pros) and do not provide the user with an understanding of when problems with their system began to occur and an indication of why.

SUMMARY

The stability index objectively reflects system reliability and availability and yet intuitively reflects the user experience with the system while also providing information about how/when problems began. The stability index display creates an easy to understand graphical interface which illustrates the stability index over time and which users can select items to obtain additional detail on the calculation of the stability index for a particular time period. The additional detail includes data used to calculate the stability index for a time period.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
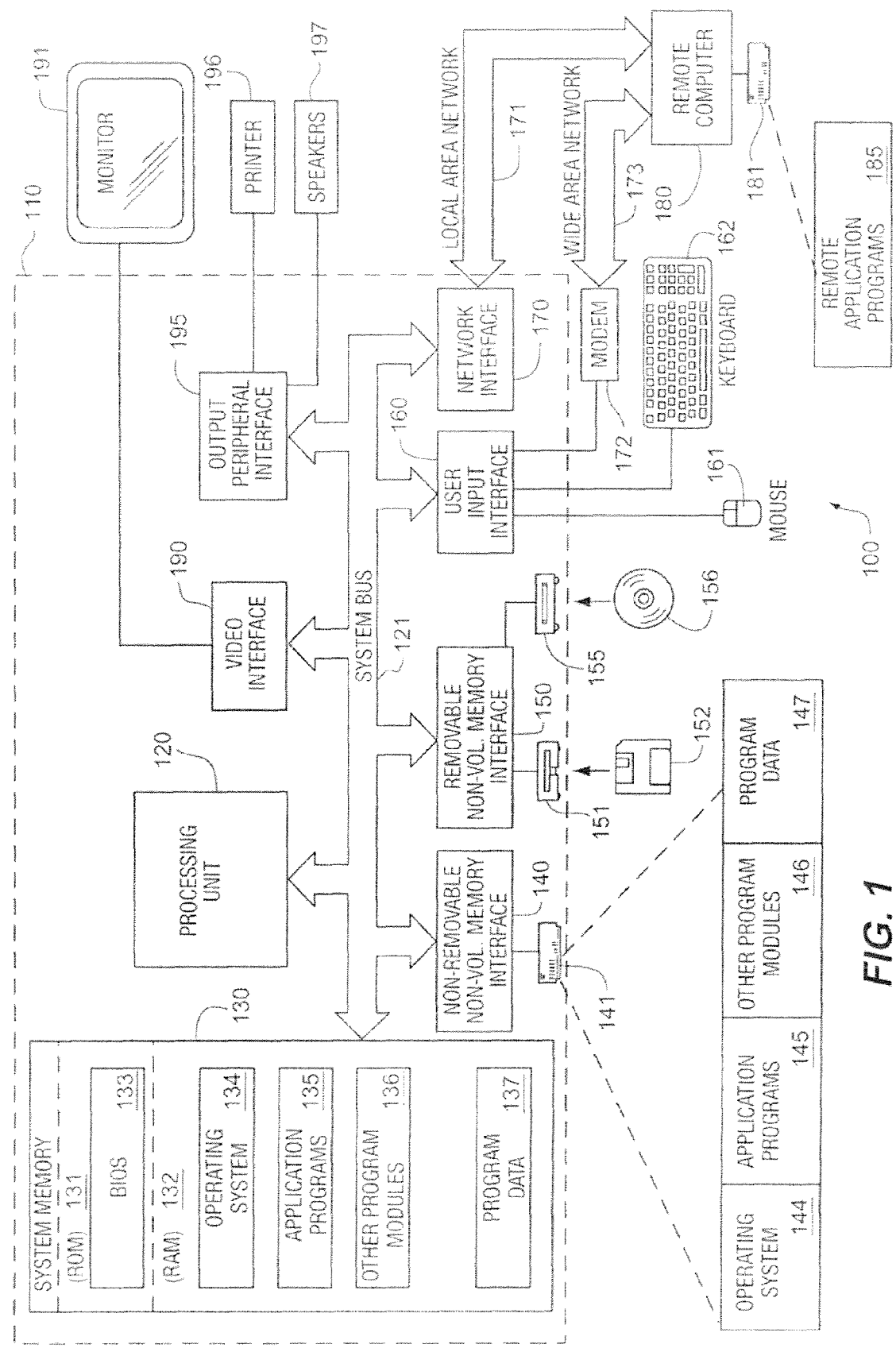
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The method and apparatus may also be practiced in distributed computing environments where tasks are performed by remote processing devices that are linked through a communication network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes a wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Reliability of hardware, such as the hardware described in FIG. 1, and software can be a significant contributor to user's satisfaction. Currently computer system reliability such as computer 110 is measured using various metrics such as mean time to failure, mean time to restore, availability, mean number of failures, etc. These are not intuitive to users and do not provide the user with an understanding of when problems began to occur and an indication of why.

Figure 2:
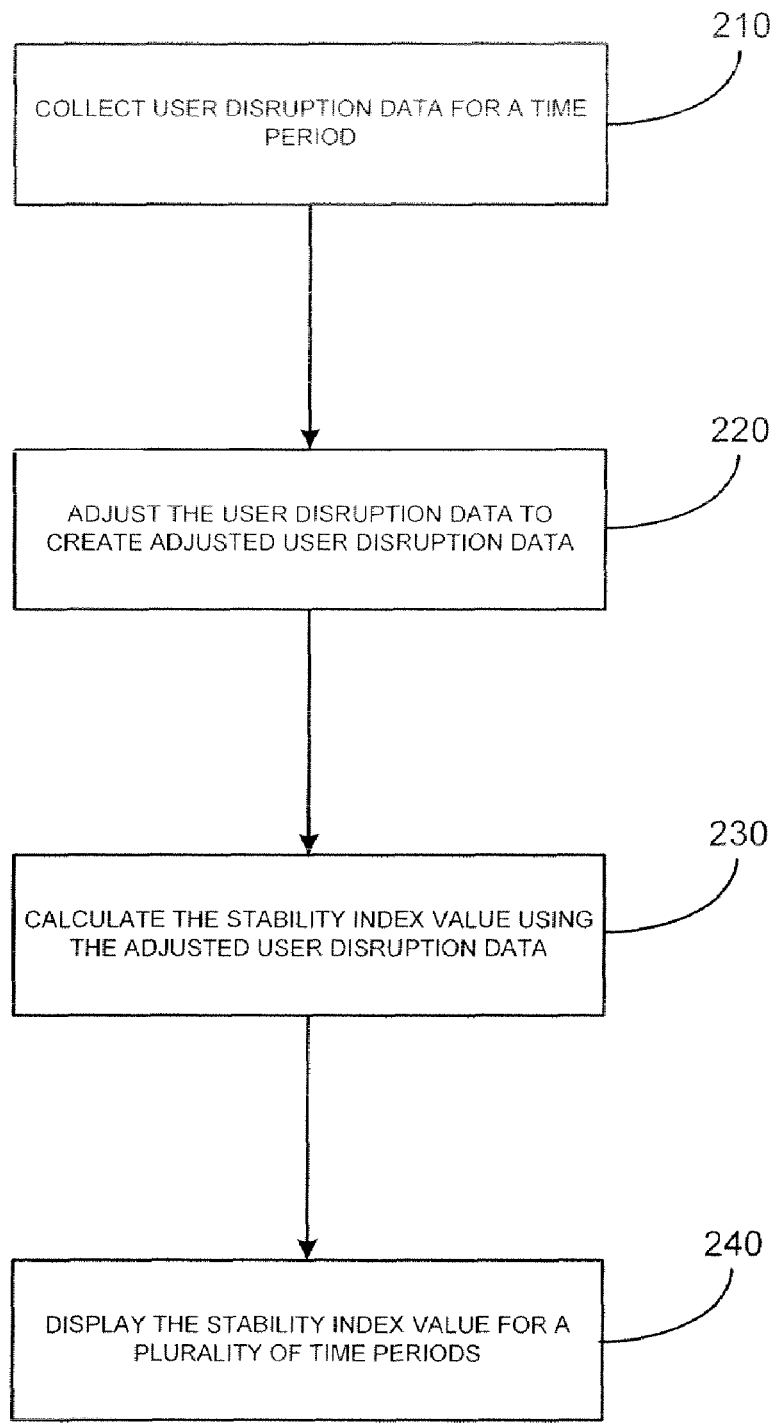
FIG. 2 is a flowchart illustrating a method in accordance of the claims.
Figure 3:
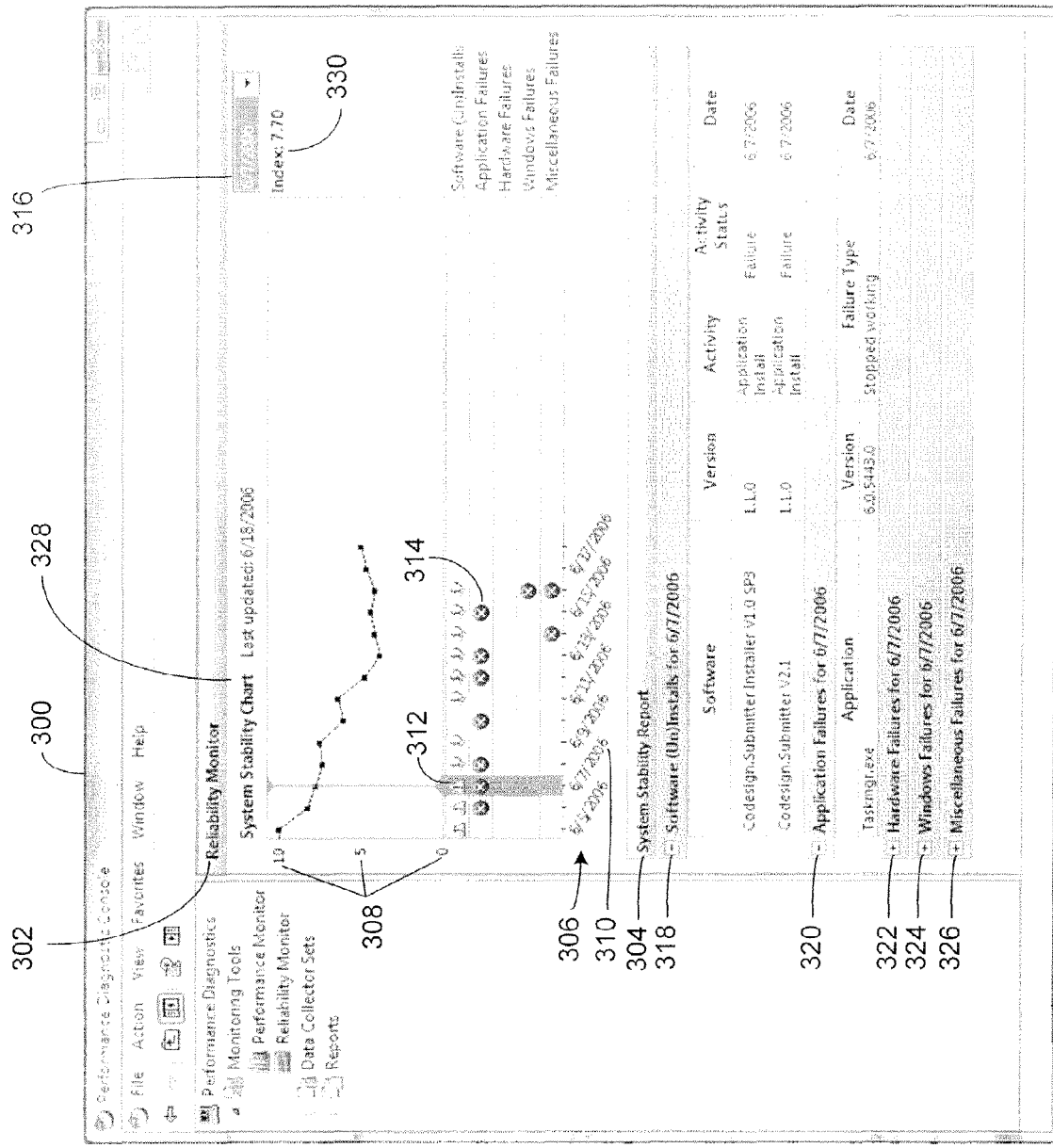
FIG. 3 is a sample illustration of a stability index display.

FIG. 2 may be an illustration of a method of creating a user interface that displays a stability index over a period of time which objectively reflects system reliability and yet intuitively reflects the user experience on the system. It also provides information regarding how/when problems began. FIG. 3 may be an illustration of a sample stability index display 300. The stability index display 300 may provide users with a consolidated view of system stability and may help them to identify and remedy system stability problems.

The stability index may also help users identify failures such as hardware failures, software failures, operating system failures, etc. and system changes or changes in software (install/uninstall/updates) that can be the cause of system reliability issues. The stability index may also enable system support technicians to assess the reliability of a user's system over time to efficiently resolve common reliability problems for both consumer and corporate environments. The stability index display 300 may have a reliability monitor 302 and a system stability report area 304 which may provide additional detail on how the stability index was determined for a time period. By being able to track and identify the source of reliability issues early, problems may be addressed sooner which will result in more stable products and more satisfied customers.

The stability index may take on a scaled value, such as a value from 1 to 10. The stability index may be designed in such a way that it changes smoothly over time which makes it easier for a non-technical user to view and understand. The index may be responsive and/or sensitive to user disruptions. If there are several user disruptions for a single day, the index may be impacted more than if there were fewer disruptions. In addition, more recent user disruptions may have a greater impact on the index than disruptions that occurred long ago.

The display of the stability index may make use of a rolling time window, weighted summation, low-pass asymmetric filter, and mapping from user disruptions to stability values in the stability index calculation to result in a smooth graph that is easy to view and understand. Also, the user may select to obtain additional information from the stability index and the display may illustrate the associated user disruptions. As a result, the stability index may intuitively reflect the user's pain about disruptions over time.

FIG. 2 may illustrate a method in a computer system for displaying on a display device a stability index. At block 210, the method may collect user disruption data for a time period. As previously explained, user disruptions may be an event that disrupts a user's intended activities on a computer system. User disruptions may be classified as planned user disruptions such as application installs that require system reboots and unplanned user disruptions such as application failures. For example, if a hard disk crashes, this would be an unplanned disruption as a user would be unable to perform intended activities. A planned disruption may be a voluntary software installation, for example.

The inputs to the stability index algorithm are events in various event channels that represent user disruptions over a rolling window. In one embodiment, the method coalesces multiple events that represent a single disruption into one event. For example, a hard drive crash may cause several applications to fail but the method may recognize that there was a single disruptive event (hard drive crash) that caused multiple events. The data of the current time interval may be combined with the cached historical data to form a vector U ($u_1$, $u_2$, ... $u_n$), in which $u_k$ represents the number of user disruptions on the $k^{th}$ time interval in the rolling window. In FIG. 3, the time period may be a day 306 as indicated by the dates on the system stability chart. Other time periods are acceptable.

A rolling window consists of n time intervals. A time interval can be an hour, a day, or some other value based on needs. The most recent time interval of the rolling window is referred to as the current time interval. The output of the stability index algorithm is the stability index for the current time interval. The stability index is a real value between [$I_{min}$, $I_{max}$]. $I_{max}$ stands for 'most stable' and $I_{min}$ stands for 'least stable.' In FIG. 3, the stability index 308 is a number between 1 and 10.

At block 220, the method may adjust the user disruption data to create adjusted user disruption data. The user disruption data may be adjusted in a variety of ways in an attempt to make the data smoother. In one embodiment, an asymmetric low pass filter F is applied to vector U. The result is a vector F(U)=($fu_1$, $fu_2$, ..., $fu_n$). where $fu_k$ is the adjusted number of user disruptions for the $k^{th}$ time interval. Filter F may have a limited support, say m time intervals, into the past. The filter may be represented by a vector F ($f_{-m}$, $f_{-(m-1)}$, ..., $f_0$), where $$\sum_{k=-m}^{0} f_k = 1.0 \text{ and } f_{k-1} \le f_k, k = -(m-1), \ldots, 0.$$

The objective of applying the filter is to redistribute user disruptions over the past time intervals so that the user disruptions result in an appropriate contribution in the calculation while providing a smooth stability curve. F(U) may be mapped to initial stability values for each time interval over the time window. The result L($l_1$, $l_2$, ..., $l_n$)=M(F)U))={(M($fu_1$), (M($fu_2$), ..., (M($fu_n$)}, where M is the mapping function that can be of any form such as a piecewise linear function.

At block 230, the method may calculate the stability index value using the adjusted user disruption data. The final stability index Idx may be the weighted sum over L, i.e., $$Idx = \sum_{i=1}^{n} w_i * l_i.$$

W($w_1$, ..., $w_n$) is the weight vector for the time intervals in the rolling window, i.e., $$\sum_{k=1}^{n} w_k = 1.0.$$

The weight vector may be designed so that more recent time intervals have greater weights and thus contribute more to the current stability index.

In addition, a greater weight may be given to user disruptions that are more intrusive than user disruptions that are less intrusive. For example, a user disruption that kept a user from using the computer system for several hours such as a hard drive crash and replacement may have a greater weight than an error that caused an application to shut down and immediately restart.

A time interval without user activity may not affect the stability index. If a machine does not have user activity over a time interval, the time interval may be excluded from the stability index calculation, i.e., the method may pretend the time interval does not exist and set the index of the time interval to the index of the previous time interval. In addition, it is also possible to give different weights to each type of event based on the expected impact on the user. For example, failures that cause a bigger user disruption (say data loss) might result in a bigger contribution to the index than a less disruptive failure. An artificially extended or shortened time period, e.g., by changing system time, may be adjusted to reflect the actual time interval when a user experiences disruptions. Accordingly, stability indices may be calculated based on the adjusted time intervals.

At block 240, the method may display the stability index value for a plurality of time periods. As the stability index has been adjusted in block 230, the display may be smooth and easy to interpret, even by non technical users.

A particular stability index value may be selected and additional detail may be displayed regarding the calculated stability index value. The additional detail may include the user disruption data for the selected period of time. For example, in FIG. 3, the date (310) of Jun. 7, 2006 has been selected and below in the system stability report 304, additional detail about system stability events may be displayed as described below in reference to the system stability report 304. In addition, specific information on events that occurred may be obtained by selecting a displayed icon. For example, additional information on software installations and un-installations on Jun. 7, 2006, may be obtained by selecting icon 312 and additional information on application failures on Jun. 15, 2006, may be obtained by selecting icon 314. The additional information may be displayed in a separate area such as in the system stability report 304. In addition, a drop down box 316 or pop-up calendar may allow a user to select a specific date and additional information may be displayed about the selected date. Also using the drop down box (316) the user can chose to view detailed information for all the available dates.

The stability report also may contain selectable stability event indications. The event indications may include software installations and software un-installations 318, application failures 320, hardware failures 322, operating system failures 324 and miscellaneous failures 326. The selectable stability event indications may match the stability events displayed in the reliability monitor 302. In the reliability monitor 302, the indication for software updates, installations and un-installations may be displayed as informational stability events as indicated, for example, by an exclamation point (!) inside a yellow triangle and installation failures may be displayed as warning stability events as indicated by a red x inside a circle. If the software installation or software un-installation indication 318 is selected, installation data may be displayed such as a name of the software, a version of the software, a software activity where the software activity comprising installation or un-installation, an activity status of the software and a date of the installation or un-installation.

If the application failure indication 320 is selected, application failure information may be displayed. The information may include an application name, an application version, a failure type and a failure date. If the hardware failure indication 322 is selected, hardware failure information may be displayed such as a hardware name, a hardware version, a failure type and a failure date. If the operating system indication 324 is selected, operating system failure information may be displayed such as an operating system module name, an operating system version, a failure type and a failure date. If the miscellaneous failure indication 326 is selected, miscellaneous failure information may be displayed such as failure name, a failure version, a failure type and a failure date.

As the stability index is a calculated scaled value, it can be used to objectively compare performance for at least one of software and hardware. It also provides an easy to view and understand display that may lead to improved user satisfaction. For example, referring to FIG. 3, a user may install new software on Jun. 7, 2006, and the stability monitor may indicate a stability value of 7.70 both on the system stability chart 328 and on an index display 330. By looking at the chart 328, a user can easily see in the stability index fell in the following days just by looking at the chart 328. In addition, the user can obtain additional information regarding the daily index calculation by selecting a date and reviewing the more detailed information in the system stability report 304.

In addition, due to the adjustment 220 to the user disruption data, the chart 328 is smoother and more visually meaningful to a user. The disruptions that were more recent and more disruptive may have a greater impact on the index which is similar to the perceptions of users. As a result, the index is better related to users' actual perception of system stability.

In addition, as the index is an objectively calculated number, it can be compared. For example, software applications may be compared to each other using the index. Even software versions may be compared. Further, different combinations of equipment and software may be compared to quickly identify problem combinations allowing quicker corrections to problems.

In another embodiment, the data from the stability monitor is available remotely. IT administrators can then quickly identify problem systems and attempt to identify the causes of user disruptions. Software and hardware manufacturers may be able to track the performance of their products, identify problems and rapidly distribute solutions. The easy to understand user interface makes it clear when user disruptions are affecting system performance and users' perceptions of products.

In another embodiment, the amount of use for a system is tracked and is used in determining the stability index. Logically, the more a system is used, the more user disruptions that may occur. As a result, by tracking the amount of use for a system, a stability index that takes into account the amount of use a system receives may produce a more useful value.

The method may be integrated into other applications. For example, if there is a task monitor, the method may be integrated into the task manager to provide stability information related to applications, hardware or even at the process level. Further, application specific stability indexes may be displayed when the applications are opened or on an application selection menu before the applications are started. A warning could be displayed to a user if during a current time period, the stability index falls below a floor.

The method may also allow the weights applied to different user disruptions to be adjusted. For example, a loss of data may be critical to some users while the loss of data may not be critical to others. The method may allow for the formula to calculate the stability index to be adjusted. As an example, to some users, a hardware failure may be more critical than a software failure and the user could adjust the weight of the different failures accordingly.

The method may provide links to events that occurred around the time of the user disruption. An event viewer may review relevant log files to provide additional detail around user disruption events. The method may also provide information about not just the stability of the system but also the availability of the system.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope present claims. Accordingly, it should be understood that the methods and apparatus described herein are illustrative only and are not limiting upon the scope of the claims.

The invention claimed is:

1. A method in a computer system for displaying on a display device a stability index, the method comprising:
collecting user disruption data from one or more computing devices for a time period;
adjusting the user disruption data to create adjusted user disruption data wherein adjusting comprises at least one selected from a group comprising:
applying weights to the adjusted user disruptions data to create weighted adjusted user disruption data such that user disruptions that occurred more recently are given a greater weight than user disruptions that occurred further in the past; and
giving a greater weight to user disruptions that are more intrusive than user disruptions that are less intrusive;

calculating the stability index value using the adjusted user disruption data wherein the stability index is a calculated scaled value that can be used to objectively compare performance for at least one of software and hardware;

displaying the stability index value for a plurality of time periods; and using the stability index to at least one selected from a group comprising:
identify problems with software applications; and
identify problems with hardware elements.

2. The method of claim 1, wherein calculating the stability index value using the adjusted user disruption data further comprises using the user disruption data for the time period to calculate a scaled value.

3. The method of claim 1, wherein calculating the stability index value using the adjusted user disruption data further comprises using the weighted adjusted user disruption data for the time period to calculate a scaled value.

4. The method of claim 1, wherein a single event that causes multiple failures is counted as a single failure event.

5. The method of claim 1, wherein an artificially extended or shortened time interval is adjusted to reflect the actual time period of user disruptions.

6. The method of claim 1, further comprising determining the amount of use a computer system receives and adjusting the stability to take into account the amount of use a computer system receives.

7. The method of claim 1, further comprising displaying a warning if the stability index fall below a floor.

8. The method of claim 1, further comprising allowing the selection of a stability index value and displaying additional detail regarding the calculated stability index value, the additional detail comprising the user disruption data for the selected period of time.

9. The method of claim 8, wherein user disruptions further comprise planned user disruptions and unplanned user disruptions.

10. A tangible computer storage medium not including a carrier wave signal comprising computer executable instruction for displaying on a display device a stability index, a portion of the storage medium physically configured in accordance with computer program instructions that causes a processor to be physically configured according to the computer executable instructions comprising instructions for:

collecting user disruption data from one or more computing devices for a time period, wherein user disruption data comprises an event that disrupts a user's intended activities on a computer system;

adjusting the user disruption data to create adjusted user disruption data wherein adjusting comprises at least one selected from a group comprising:
applying weights to the adjusted user disruptions data to create weighted adjusted user disruption data such that user disruptions that occurred more recently are given a greater weight than user disruptions that occurred further in the past; and
giving a greater weight to user disruptions that are more intrusive than user disruptions that are less intrusive;

calculating the stability index value using the adjusted user disruption data wherein the stability index is a calculated scaled value that can be used to objectively compare performance for at least one of software and hardware;

displaying the stability index value for a plurality of time periods; and using the stability index to at least one selected from a group comprising:
identify problems with software applications; and
identify problems with hardware elements.

11. The computer readable medium of claim 10, wherein calculating the stability index value using the adjusted user disruption data further comprises using the weighted adjusted user disruption data for the time period to calculate a scaled value.

12. The computer readable medium of claim 10, wherein an artificially extended or shortened time interval is adjusted to reflect the actual time period of user disruptions.

13. The computer readable medium of claim 10, the computer executable instructions further comprising instructions for determining the amount a use a computer system receives and adjusting the stability to take into account the amount of use a computer system receives.

14. A computer system comprising a processor, a memory in communication with the processor and an input/output circuit, the processor being configured in accordance with computer executable instructions, the computer executable instructions comprising instruction for:

the processor being physically configured according to computer executable instructions to collect user disruption data from one or more computing devices for a time period, wherein user disruption data comprises an event that disrupts a user's intended activities on a computer system;

the processor being physically configured according to computer executable instructions to adjusting the user disruption data to create adjusted user disruption data wherein adjusting the user disruption data further comprises applying weights to the adjusted user disruptions data to create weighted adjusted user disruption data such that user disruptions that occurred more recently are given a greater weight than user disruptions that occurred further in the past;

the processor being physically configured according to computer executable instructions to calculate the stability index value using the adjusted user disruption data wherein adjusting comprises at least one selected from a group comprising:
applying weights to the adjusted user disruptions data to create weighted adjusted user disruption data such that user disruptions that occurred more recently are given a greater weight than user disruptions that occurred further in the past; and
giving a greater weight to user disruptions that are more intrusive than user disruptions that are less intrusive;

the processor being physically configured according to computer executable instructions to display the stability index value for a plurality of time periods; and the processor being physically configured according to computer executable instructions to display a warning if the stability index fall below a floor.

15. The computer system of claim 14, the processor being physically configured according to computer executable instructions for calculating the stability index value using the adjusted user disruption data wherein the processor is physically configured according to computer executable instructions for using the weighted adjusted user disruption data for the time period to calculate a scaled value.

* * * * *